United States Patent [19]

Peterson

[11] 4,104,094

[45] Aug. 1, 1978

[54] APPARATUS FOR FORMING CLEATS ON BELTING

[76] Inventor: Soren E. Peterson, 1649 W. 3300 South, Salt Lake City, Utah 84119

[21] Appl. No.: 751,262

[22] Filed: Dec. 17, 1976

[51] Int. Cl.² .......................................... B32B 31/14
[52] U.S. Cl. .................... 156/500; 156/581; 156/583; 425/28 B; 425/28 D; 425/34 B; 425/41; 425/121; 425/128
[58] Field of Search ............... 156/137, 138, 140, 96, 156/126, 153, 394, 398, 403, 499, 500, 288, 381, 580, 581, 583; 264/248, 249, 259, 266, 274, 319, 320, 322; 425/28 B, 28 D, 34 R, 34 B, 35, 40, 41, 42, 47, 501, 517, 519, 520, 121, 125, 127, 128, 364 R; 100/214, 219

[56] References Cited

U.S. PATENT DOCUMENTS

| | | | |
|---|---|---|---|
| 2,318,377 | 5/1943 | Crowley | 425/41 |
| 2,377,484 | 6/1945 | Elmendorf | 156/288 |
| 2,786,235 | 3/1957 | Schieferstein | 425/121 |
| 2,990,874 | 7/1961 | Hawkinson | 156/96 |
| 3,373,067 | 3/1968 | Hagstrom | 264/248 |
| 3,679,498 | 7/1972 | Andersen | 156/153 |
| 4,008,027 | 2/1977 | Polk | 425/127 |

*Primary Examiner*—Caleb Weston

[57] ABSTRACT

Apparatus and method for forming and fixing cleats to belting, for forming industrial conveyor belts and the like as a usable product. Various durometers can be chosen by selection of cure-cycle for the cleats, which may be different from that of the belting itself. No metal fasteners are employed; rather, in a preferred form of the invention, the cleat is both formed, cured, and pressed against the belting under raise-temperature conditions during the cure cycle. The cleat will be securely bonded or vulcanized to the belting. Rubber cement can be employed at cleat-securement surfaces. The invention also comprehends multiple cleats being simultaneously secured to the belting.

4 Claims, 11 Drawing Figures

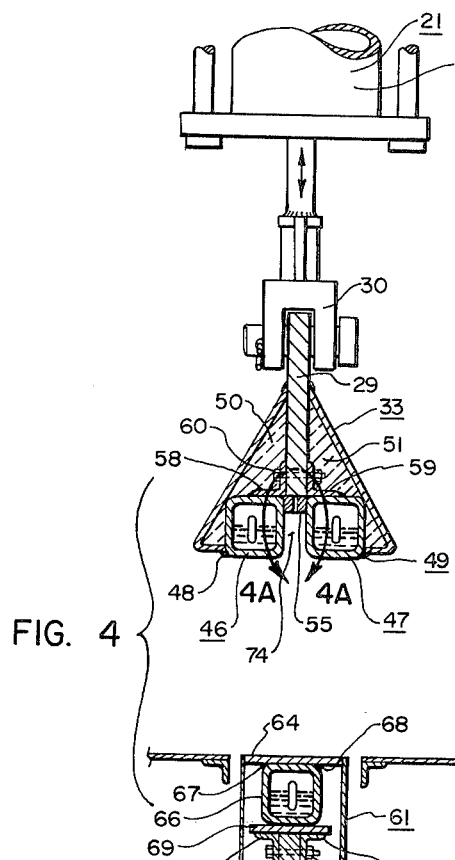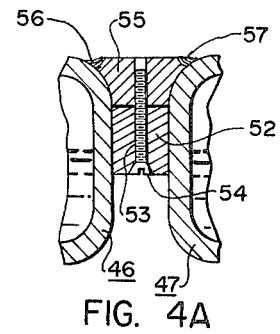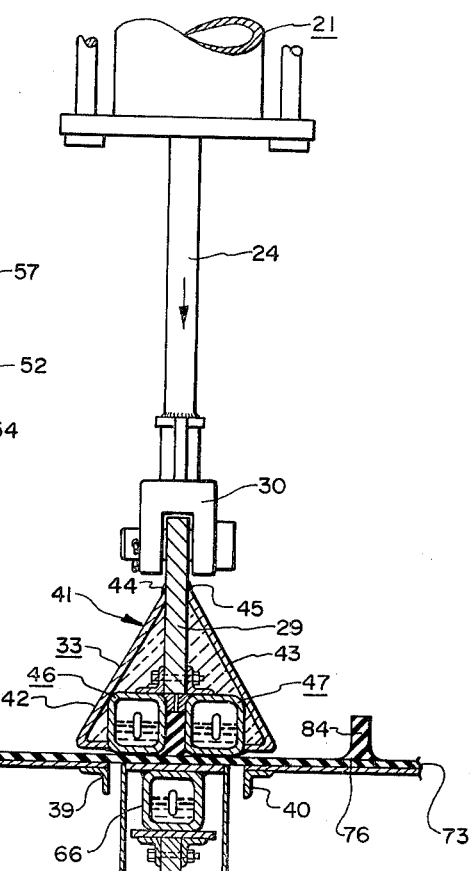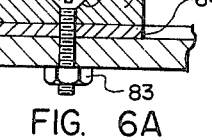

APPARATUS FOR FORMING CLEATS ON BELTING

FIELD OF INVENTION

The present invention relates to a method and apparatus for positioning and securing cleats to industrial belting and, more particularly, provides means for securing cleats of any desired characteristic to belting which may have different characteristics, and also a new end product.

DESCRIPTION OF PRIOR ART

In the past many types of cleated belting have been manufactured for various purposes, such as treads, endless conveyors, and so forth. A customary method of manufacture is to fabricate the belting and cleats simultaneously. This can be formed even by an extrusion process. A principal difficulty of simultaneously forming the cleats in belting is that often the cleats should have certain physical characteristics different from the belting. Thus, the belting is usually supplied with a reinforcing web whereas the cleats usually are not so supplied. Additionally, the durometer of the elastomeric material, such as rubber, which is employed to fabricate the belting, may not be suitable for the cleats. Thus, in the conveyors of vegetables, such as potatoes, very soft cleats should be used so as to avoid damaging the produce, e.g. by rupturing their skins.

Another approach has been to supply belting and then to supply separate cleats which must be secured by metal attachments at various points along the belts. The holes required in a belting of course weakens the belt. Furthermore, when cleats become worn the attachments are apt to protrude from the belt and/or cleat so as to damage produce being conveyed by the cleats thereon. In fact, there are a number of reasons why the conventional metal fasteners used to attach cleats to belts are undesirable, among which are, wear, weathering, rust, ultimate protrusion, lack of ease in manipulation, and so forth.

BRIEF SUMMARY OF THE INVENTION

According to the invention, straight belting is supplied and is suitable for receiving cleats. The cleats themselves are secured by a bonding or vulcanizing-type process, the application of heat being supplied generally for such securement. In a preferred form of the invention a cleat is made of essentially raw rubber and is thrust into a mold or die that both forms the cleat and applies sufficient heat and pressure for curing the cleat appropriately and also for ensuring that the same is secured, by a heat-seal, to the proximate surface of the belting. Either single or multiple cleats may be so formed, cured, and attached to the belting during a single cure cycle.

OBJECTS

Accordingly, a principal object of the present invention is to provide a new method for securing cleats to belting, and product formed thereby.

A further object is to provide a method of simultaneously curing cleats and heat-securing the same to belting.

A further object is to provide structure for forming cleats and for securing the same to belting.

A further object is to provide structure for selectively curing and attaching cleats to belting.

A further object is to provide for the simultaneous securement of a given number of cleats to belting, for forming a cleated belt to be joined at its end, e.g. at job site.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

BRIEF DESCRIPTION OF DRAWINGS

FIG. 4 is an enlarged, transverse vertical section taken along the line 4—4 in FIG. 1, illustrating the heating and press-structure.

FIG. 4A is an enlarged fragmentary detail taken along the arcuate line 4A—4A in FIG. 4.

FIG. 5 is similar to FIG. 4 but illustrates the press structure as descending to the table of the apparatus for forming and curing a cleat and also attaching the same to belting.

FIG. 6 is an enlarged fragmentary detail principally in section and taken along the line 6—6 of FIG. 3.

FIG. 6A is an enlarged fragmentary detail taken along the arcuate line 6A—6A in FIG. 6.

DESCRIPTION OF PREFERRED EMBODIMENTS

Figure 1:
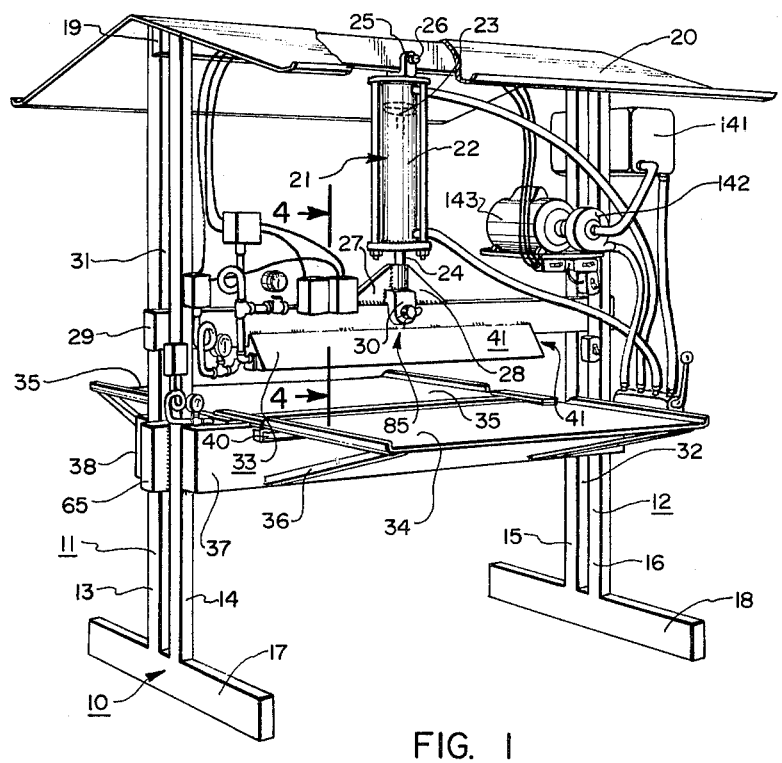
FIG. 1 is a perspective view, partially broken away, of apparatus used in a preferred embodiment of the invention.
Figure 2:
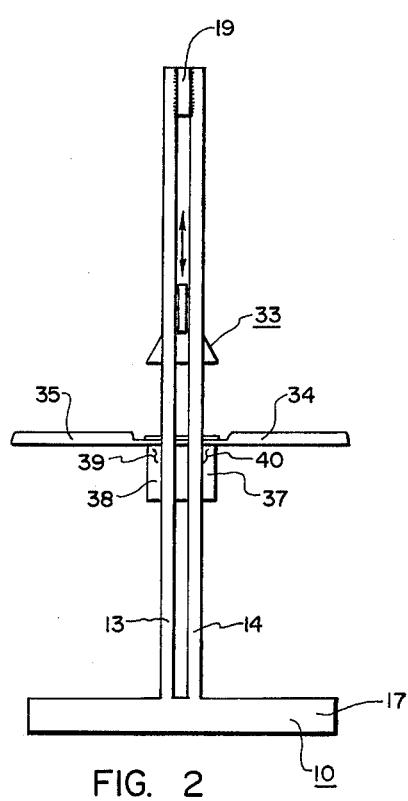
FIG. 2 is a side elevation of the left end of the structure of FIG. 1, minus the protective hood.

In the drawings the apparatus 10 includes opposite upright structure 11 and 12 which are provided and comprise upright rails 13–16 joined together by respective feet 17 and 18 at their base. A crossbar 19 is secured between the rails on opposite sides of the structure and is welded thereto. The same supports and is secured to a hood 20. Crossbar 19 supports press, or pressure means 21 comprising a cylinder 22 and a piston 23 therein joined to piston rod 24. The cylinder 22 includes a clevis 25 that is provided bolt means 26 for attachment cylinder to the crossbar 19. Where desired, gusset 27 and 28 may be welded in place to crossbar 29 and piston rod clevis extension 30 for added strength. Crossbar 29 travels up and down within slots 31 and 32 and is secured as by welding to a heat element housing 33. The structure is constructed such that a downward movement of piston 23 will produce a downward movement of crossbar 29 and heat element housing 23, to accomplish the affixing and securing of a cleat to the rubber belt, hereinafter described. Support members 34 and 35 comprise a bed and are essentially horizontal and are secured in place by a plurality of braces 36. Stationary crossbars 37 and 38 may be welded or otherwise secured to the upright rails 14, 16 and 13, 15 and be provided with respective angle irons 39 and 40, secured to such crossbars, for support purposes, see FIG. 5.

Figure 7:
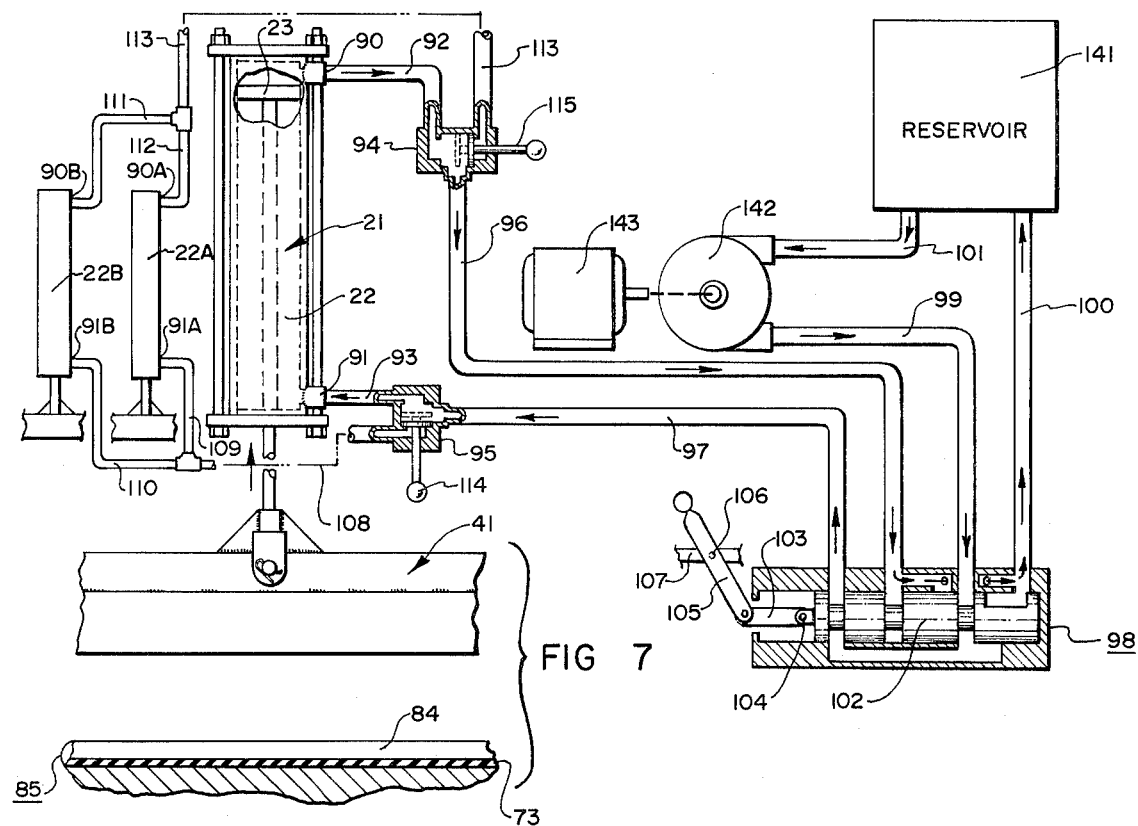
FIG. 7 is a fragmentary detail, principally in schematic form, of the press structure and hydraulic system used in connection therewith, the system in FIG. 7 being conditioned for piston-return within the pressure cylinder.
Figure 8:
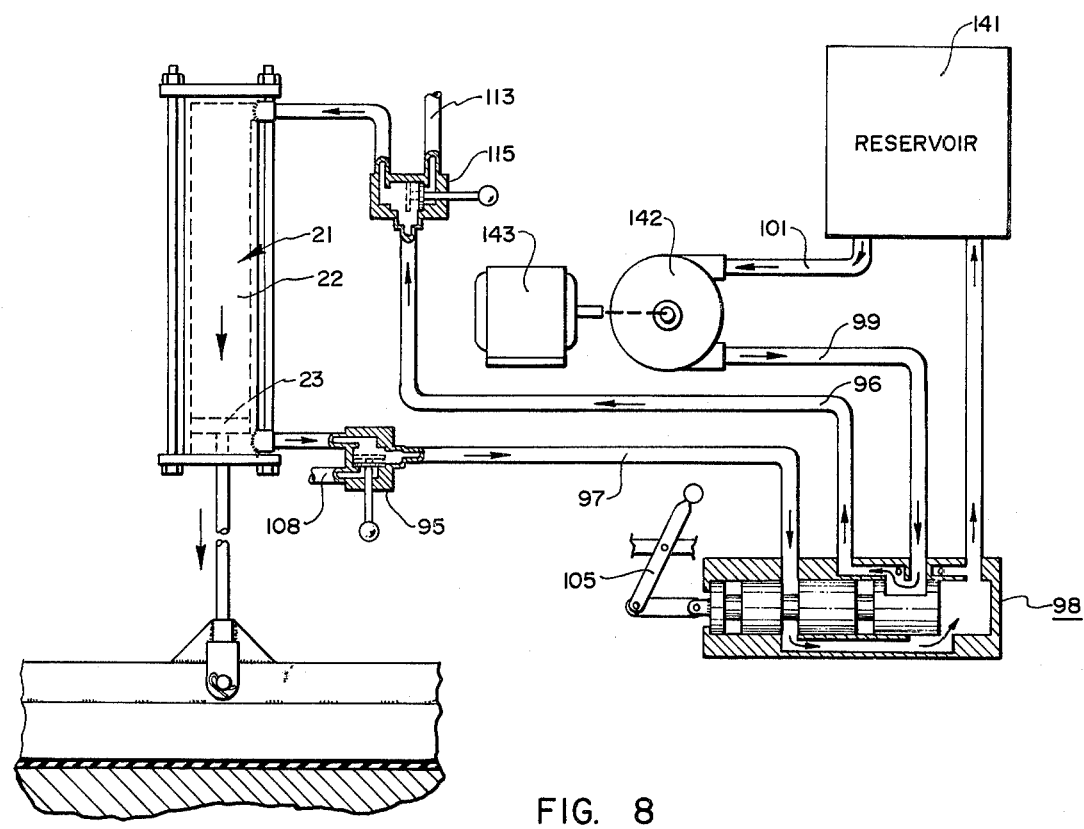
FIG. 8 is simular to FIG. 7 but illustrates a flow-reversal setting by the operator-handle so that the piston within the pressure cylinder progresses downwardly to pressurize cleat-forming structure over cleat material to be affixed to belting.

Hydraulic reservoir 141 is secured to upright rails 15, 16 by any conventional means, see FIG. 1, and is provided with a pump 142 and motor 143 driving and connecting the same. The valving and hydraulic conduit will be described hereinafter as is illustrated in FIGS. 7 and 8.

The cleat-forming tool 41 of FIGS. 1 and 5 includes the aforementioned housing 33 which simply may be made up of a pair of formed plates 42 and 43 which will be welded to the crossbar at 44 and 45 and also to the heating elements 46 and 47 at weld margins 48 and 49. Insulation may be provided at 50 and 51 as shown in FIG. 4. Disposed between the heat elements 46 and 47 is a spacer 52 provided with a recessed aperture 53 accommodating bolt 54. An elongate fixed spacer 55 may be welded at 56 and 57 to the two heating elements 46 and 47. Correspondingly, for attachment purposes, there will be elongate angle irons 58 and 59 that are bolted by bolt means 60 to crossbar 29; these angle irons are welded or otherwise secured to each of the heating elements 46, 47 in FIG. 4.

An elongate horizontal structure 61 includes formed plates 62 and 63 that are welded or otherwise secured to bed plate 64 and also fixed on a cross-beam 65. The cross-beam 65 will be securely welded in place as shown in FIG. 1. Heating element 66 is welded at 67 and 68 to the bed plate 64 and likewise is supported on and is secured to plate 69, the latter being secured to cross-beams 65 by angle irons 70, 71 and attachment 72.

In operation as to the structure thus far described, the apparatus in FIG. 4 is in a "ready condition" to receive belt 73 in FIG. 5. The workman supplies himself with an elongate strip of uncured rubber or other suitable elastomeric substance and places the same in slot 74 in FIG. 4, causing a portion of the same to protrude downwardly slightly below the lower surfaces of heating elements 46, 47. Cylinder 22 is actuated so that its piston 23 distends, thereby causing the crossbar 29 and indeed the entire heat-forming tool 41 to proceed downwardly such that the lower surface of the raw rubber, for example, contacts the upper surface of belt 73.

The cleat-forming tool serves the dual purpose of simultaneously forming and curing the cleat and also securing the same to belt 73 to form a cleated belt 75. For some purposes it will be desirous to incorporate a rubber cement on the top surface of the belt at 76 which is intended to receive a cleat. It is noted that the bottom heating element 66 is applied to the underside of the belt strip area below the intended cleat, whereas the other heating elements form the sides of the cleat and also are effective to apply heat proximate the juncture of the cleat and belt.

Once the apparatus is in the condition shown in FIG. 5, for cleat-forming and application to the belt, then the clamps 76, one at each end of the structure, will be applied and the bolt 77 tightened down. The clamps comprise vertically elongated loops of rigid construction and having an end 78 provided with drilled and tapped apertures 79 for receiving the tightening bolts 77. The tightening down of these bolts will produce a clamping action so that additional pressure by cylinder 22 need not be applied; in fact, hydraulic pressure may be released once the clamps at 76 are emplaced at opposite sides of the structure for retaining the crossbar 29 in a pressure relationship relative to stationary beam 65.

For uniformity and fabrication, spacers or stop means 80, FIGS. 6 and 6A, may be provided outside of but proximate belt-placement area 80A with countersunk apertures 81 for receiving recessed screws 82 as secured by nuts 83. Elements 80 may comprise rods, strips, enlarged washers, and so forth, subject to controlling the descent of the bottom surfaces of heating elements 46 and 47 to a point at or only slightly below the upper surface of the belt 73. Elements 80, therefore, serve as limit stops and may be secured to the upper surface of element 64 in FIG. 4 or even to and across the angles 39, 40.

It will appear in FIG. 4 and FIG. 4A that the height of the cleat 84 may be varied in accordance with the position or non-presence of an appropriate spacer 52 of selectable thickness, see FIG. 4A.

FIG. 1 thus includes a press structure 85 for forming each cleat and pressuring the same onto a belt. Such a structure will include the cylinder, the crossbar 29, the associated heating elements, and so forth. Press structure 85 may likewise be contained at 85A and 85B to form a series of press structures, the spacing of which can be selected relative to press structure 85 in FIG. 3. Accordingly, provision is made for forming not merely one cleat at a time, with secured disposition to a belt, but also a plurality of cleats that can be formed and bonded to the belting even at one time. In such event, there may be one or more toothed cross-rail 86, e.g. secured at 87 to upright 11 and supported at its outer end by suitable standard structure 88; crossbars 19A and 19B, correspond to crossbar 19 in FIG. 1. These may be selectively spaced from structure 11 by simply lifting and moving the press structures 85A and 85B such that the respective crossbar 19A, 19B may fit into the selective recesses 89 of each of the beams or cross-rails 86 which will be disposed parallel to and opposite each other, being connected to uprights 11 and 12, respectively. The welded structure may be made sufficiently strong so that there need be no base support relative to the additional press structures 85A, 85B.

Figure 3:
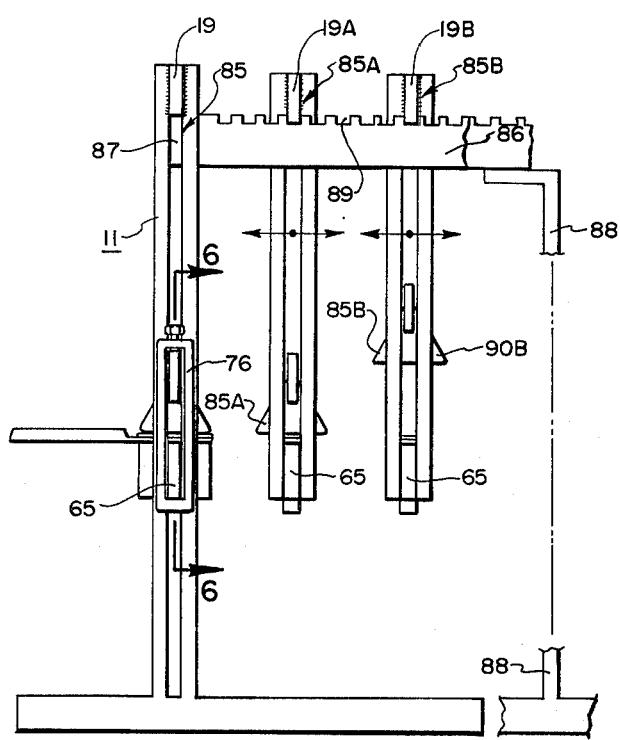
FIG. 3 is similar to FIG. 2 but illustrates that a series of press units may be employed for accomplishing simultaneous forming and attachment of cleats to belting.

In FIG. 7 cylinder 22 is provided with ports 90 and 91 connected to conduit 92 and 93, these conduit being in turn connected to valves 94 and 95. Conduit 96 and 97 are in turn coupled to the valve means 98, the same likewise being provided with conduit 99 and 100 connecting to reservoir 141 and pump 142 as shown. Conduit 101 is a supply conduit interconnecting reservoir 141 with the pump 142. Valve means 98 in the embodiment shown is a spool valve having a spool or shuttle, translational right and left, and includes the spool 102; the same is provided with link 103 that is pivoted to the nub-end of the spool, 104, and is likewise pivoted to control arm 105. The latter is medially fulcrummed by pivot means 106 connected to fixed structure 107. Valve means 98 is shown schematically.

Where the additional press structures 85A and 85B are employed as seen in FIG. 3, then additional cylinders 22A, 22B, see FIG. 7, will be supplied, corresponding with and operably associated with and made a part of the individual press structures. Conduit 108, 109 and 110 will complete the hydraulic connections from valve 95 to the lower ports of the two cylinders 22A and 22B, at 91A and 91B; correspondingly, the ports 90A and 90B will be coupled by conduit 111, 112 and 113 to valve 94 as shown. Valve controls 114 and 115 will be designed such that either solely the first unit of the first press unit, i.e. that is seen in FIG. 1 and also at 23 in FIG. 7, will be actuated so as to fix a single cleat to belting; or, the control handles will be moved so that not only this first press unit will be actuated but also the second and third press units at 85A and 85B, so that multiple cleats may be affixed simultaneously to the belting, and not just one cleat during a particular cure cycle. Valve means 98 is designed as indicated or equivalent thereto such that actuation of the valve in one direction will produce a raising of the cylinder 22, see FIG. 7, or a lowering of such cylinder 22 as seen in FIG. 8 upon a reversal of the valve as shown and a reversal of the flow pattern as indicated.

FIG. 8 illustrates the condition wherein the additional press units with their cylinders 22A and 22B are coupled into the system such that plural or multiple cleats may be cured at the same time.

Figure 9:
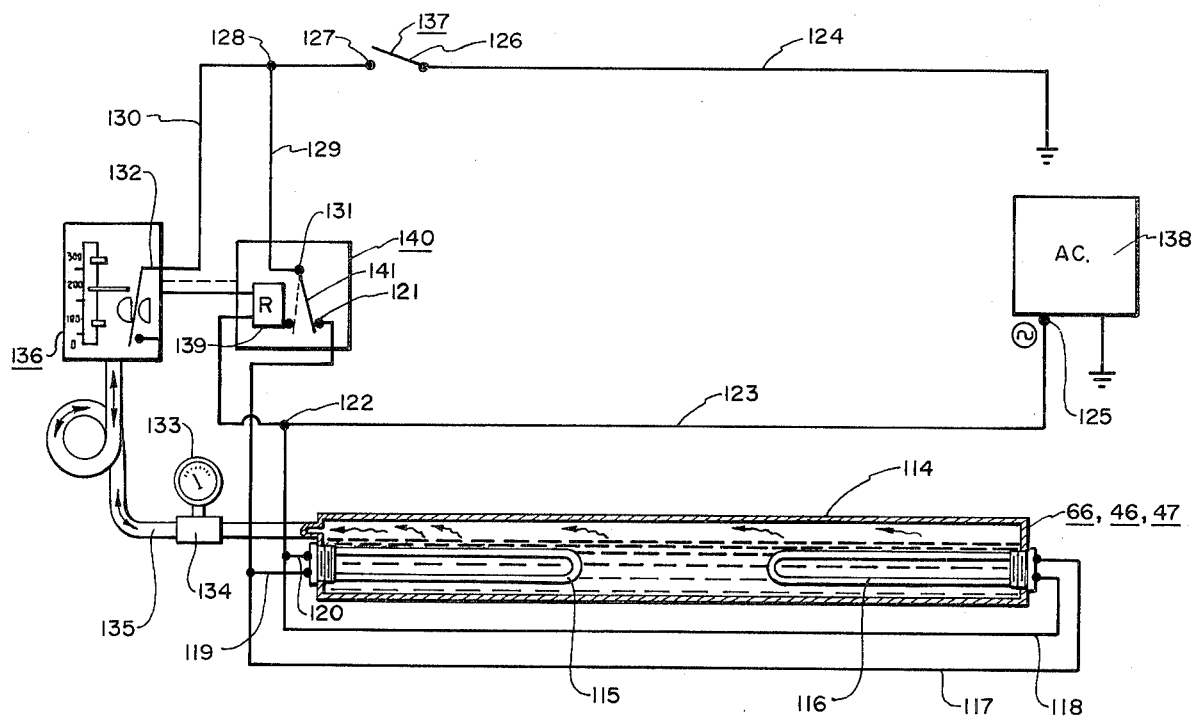
FIG. 9 is an electrical diagram illustrating one of three identical circuits employed to apply heat proximate the cleat-forming area of the structure.

FIG. 9 illustrates a representative circuit for a representative heating element in FIG. 5. Heating element 66, for example, may be provided with a fluid jacket 114 provided with heating probes 115 and 116. These heating probes will be disposed at opposite ends of the heating jacket and be coupled by electrical leads 117, 118, 119 and 120 to relay contact 121 and junction 122 as indicated. Leads 123 and 124 are coupled as shown to terminal 125 and switch arm 126. Switch contact 127 of switch 137 is connected to junction 128. Junction 128 joins leads 129 and 130, the latter being connected as shown to relay point 131 and control 132. Pressure gauge 133 is teed, by tee 134, into fluid or steam pressure line 135, the same leading to control 136.

It will be understood that the above circuit is applicable and will be supplied as the respective circuit to each of the heating elements 46, 47 and 66 in FIGS. 4 and 5.

In operation, the on-off switch 137 will be in the "off" condition initially so that no electrical current is conducted to the heating element, i.e. element 66 in FIG. 9. Thus, the probes 115 and 116 remain unenergized. Upon the closing of switch 137, then electricity will be conducted via leads 117 and 118 and the leads connected thereto as seen in FIG. 9, whereby AC power is coupled from AC source 138 to such heating element 66. The probe will commence to heat until the vapor pressure rises sufficiently to actuate automatic control 132, at which point the associated, normally closed relay 139 of control section 140 will be energized so as to pull the relay arm 141 to the dotted line condition, this indicating that excessive vapor pressure is experienced and hence the maximum operating temperature has been reached. Once the unit cools down slightly, then a mercury switch inside conventional Honeywell temperature control at 132 will be returned so that the relay is de-energized, thereby permitting the spring-biased arm 141 to spring back to re-engage relay terminal 121, thereby reapplying electrical power to heating element 66.

The temperature control 136 is standard in the industry and is responsive to steam pressure to turn on and off an electrical circuit; such is familiar in connection with home water heaters and is conventional. The gauge 133 is simply an additional check for steam or vapor pressure relative to the associated heating element.

A separate control 136 will be supplied each of the circuits, corresponding to that shown in FIG. 9, for each of the heating elements 66, 46 and 47.

What is provided, therefore, is apparatus for automatically forming and securing cleats to belting. It is noted that the durometer of the cleats may be controlled by the heat-cure cycle selected. Furthermore, the durometer of the cleats may be the same as or different from the belting supplied. Additionally, conventional attachment such as screws, nuts, and so forth, are avoided, thereby contributing to longer wear of the cleated belt ultimately produced. Cleats may be applied one by one to the belting, or may be applied in plural numbers as in connection with the operation of the structure of FIG. 3. Cleats may be chosen to be soft, for potato or vegetable conveyance, for example, or harder, for other uses.

It is seen that the subject machine is light-weight, takes minimum floor space, e.g. 3 feet × 5 feet, and does away with steam pipes, boilers, etc., and the expense associated therewith.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. Apparatus for affixing cleats to belting including, in combination: a bed; a press disposed over said bed and having a cleat-forming die; first and second, mutually spaced means for heating said die coupled thereto, said bed including a support disposed underneath said die; third means for heating said support, said first, second, and third means each including interior, fluid-containing cavities and electrical heating elements disposed within said cavities; and means for supplying electrical power to said electrical heating elements.

2. Apparatus for forming and affixing cleats to belting, including, in combination: first means for supporting belting; and second means for forming a cleat and for bonding said cleat to said belting, said second means including a fluid-containing cavity and an electrical heating element disposed in said cavity; and third means responsive to pressure within said cavity for supplying automatically controlled electrical energy to said electrical heating element.

3. The structure of claim 2 wherein said second means comprises means for simultaneously pressure-forming and heat-bonding said cleat to said belting.

4. The apparatus of claim 2 wherein said second means includes selectively removable cleat-dimension determining means, and attactment means for releasably securing said cleat-dimension determining means to said second means.

* * * * *